(12) United States Patent
Beer et al.

(10) Patent No.: US 12,411,211 B2
(45) Date of Patent: Sep. 9, 2025

(54) MULTISTATIC RADAR SYSTEM AND A METHOD FOR A SPATIALLY RESOLVED DETECTION OF AN OBJECT UNDER TEST

(71) Applicant: Rohde & Schwarz GmbH & Co. KG, Munich (DE)

(72) Inventors: Matthias Beer, Munich (DE); Marius Brinkmann, Munich (DE); Gerhard Hamberger, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 578 days.

(21) Appl. No.: 17/507,336

(22) Filed: Oct. 21, 2021

(65) Prior Publication Data
US 2023/0128858 A1 Apr. 27, 2023

(51) Int. Cl.
 *G01S 7/41* (2006.01)
 *G01S 7/02* (2006.01)
 *G01S 13/00* (2006.01)
 *G01S 13/89* (2006.01)

(52) U.S. Cl.
 CPC .............. *G01S 7/412* (2013.01); *G01S 7/025* (2013.01); *G01S 13/003* (2013.01); *G01S 13/89* (2013.01)

(58) Field of Classification Search
 CPC ....................................................... G01S 13/89
 See application file for complete search history.

(56) References Cited

U.S. PATENT DOCUMENTS

| 2004/0111200 A1* | 6/2004 | Rao ....................... B60R 21/013 701/45 |
| 2009/0040098 A1* | 2/2009 | Lee .......................... G01S 7/412 342/175 |
| 2023/0014948 A1* | 1/2023 | Guan ................... G06V 10/751 |

FOREIGN PATENT DOCUMENTS

| CN | 101685154 B | 12/2012 | |
| JP | 2019100772 A * | 6/2019 | ............... G01S 7/41 |
| WO | 2017/105566 A1 | 6/2017 | |

OTHER PUBLICATIONS

Kong, Lingyu et al., Calibration of a Polarimetric MIMO Array With Horn Elements for Near-Field Measurement, Feb. 27, 2020, IEEE, vol. 68 No. 6, pp. 4489-4501 (Year: 2020).*

Kong, L. and X. Xu, "Calibration of a Polarimetric MIMO Array With Horn Elements for Near-Field Measurement," IEEE Transactions of Antennas and Propagation, vol. 68:6, Jun. 2020, pp. 4489-4501.

(Continued)

*Primary Examiner* — Vladimir Magloire
*Assistant Examiner* — Eric K Hodac
(74) *Attorney, Agent, or Firm* — CHRISTENSEN O'CONNOR JOHNSON KINDNESS PLLC

(57) ABSTRACT

The present disclosure generally relates to a multistatic radar system and a method for a spatially resolved detection of an object under test. The multistatic radar system includes an at least two-dimensional multistatic array of antenna elements having an at least partially shared coverage area. At least one data processing circuit is coupled to the array. Analog and/or digital beamforming is performed thereby obtaining at least one image of the object under test at least partially being located within the shared coverage area. Processing the image obtained is used to resolve at least one scattering center of the object under test. A spatially resolved scattering (Continued)

center distribution is determined based on the image obtained.

20 Claims, 5 Drawing Sheets

(56) References Cited

OTHER PUBLICATIONS

Krieger, G. and A. Moreira, Spaceborne bi- and multistatic SAR: potential and challenges, IEE Proc.—Radar Sonar Navig., vol. 153:3, Jun. 2006, pp. 184-198.
Smith, G.E. and B.G. Mobasseri, "Analysis and Exploitationof Multipath Ghosts in Radar Target Image Classification," IEEE Transactions on Image Processing, vol. 23:4, Apr. 2014, pp. 1581-1592.
Yang, Y. et al., "Experimental analysis of fully polarimetric radar returns of a fixed-wing UAV," IET Radar, Sonar & Navigation, Special Issue: Innovative Radar Detection, Tracking and Classification for Small UAVs as an Emerging Class of Targets, vol. 14, Issue 4, 2020, pp. 523-531.
Ai, X. et al., "Feature Extraction of Micro-Motional Targets via Time-Range Distribution," IEEE Aceess, vol. 7, pp. 118889-118897.
Bucciarelli, M. et al., "Multi-sensor ISAR technique for translational motion estimation," OCEANS 2015—Genova, IEEE, May 18, 2015, pp. 1-5.

\* cited by examiner

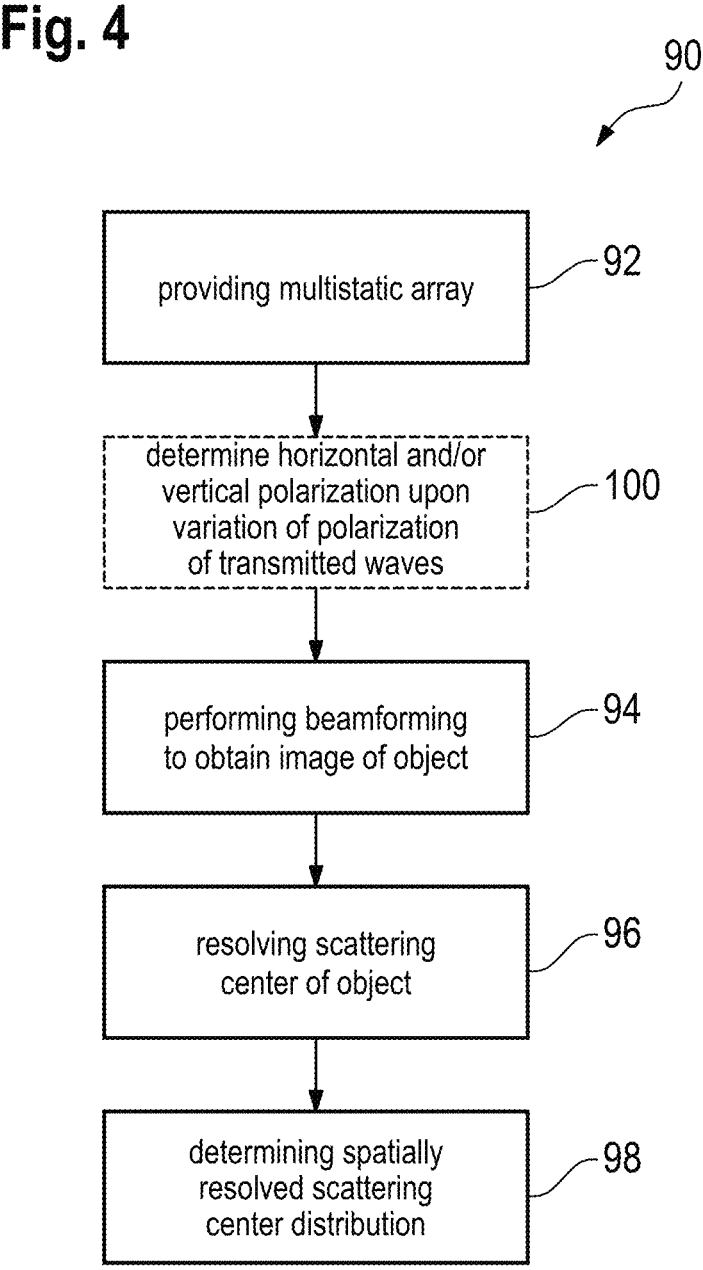

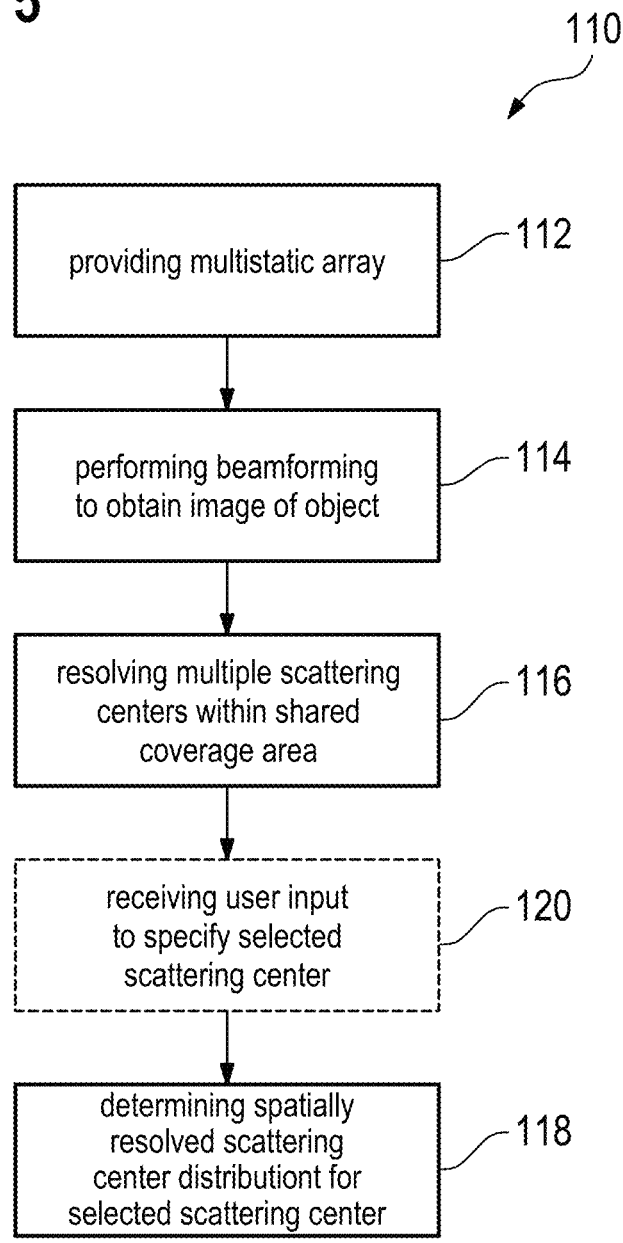

MULTISTATIC RADAR SYSTEM AND A METHOD FOR A SPATIALLY RESOLVED DETECTION OF AN OBJECT UNDER TEST

FIELD OF THE DISCLOSURE

The present disclosure generally relates to a multistatic radar system and a method for a spatially resolved detection of an object under test.

BACKGROUND

For detecting objects radar sensors are applied according to some approaches to determine radar cross sections (RCSs) which describe an object's ability to reflect an incident electromagnetic wave transmitted by a radar transmitter towards the object.

However, known radar sensors comprise monostatic components insofar that radar cross section information can reliably be obtained only under far field conditions. That is, the dimensions of the scattering objects are large compared to the wavelength of the transmitted electromagnetic waves. Spoken differently, far field conditions refer to distances when propagation of the transmitted electromagnetic waves can be approximated as electromagnetic plane waves.

In many technical fields, e.g., the automotive area, far field conditions are not always met due to the low distance between the radar sensor and the object. For example, assuming a size of the object under investigation is about 2 m (e.g., rear-side of a car), the far-field condition is only achieved at distances of more than 2000 m. More particular, the far field range $r_{FF}$ is determined according to:

$$r_{FF} = \frac{2 \times D^2}{\lambda},$$

where D corresponds to the dimension of the object under investigation (the reflector) and $\lambda$ is the wavelength of the radiation used to test the object. Typical frequencies of the underlying radiation are at 75 GHz, which corresponds to $\lambda$ being approximately 0.004 m. For the indicated example of D=2 m, this results in $$r_{FF} = \frac{2 \times D^2}{\lambda} = \frac{2 \times (2 \text{ m})^2}{\sim 0.004 \text{ m}} \cong 2000 \text{ m}.$$

Hence, the object would need to be arranged at distances larger than 2000 m from the radar sensor for far field conditions to be valid. Obviously, these conditions are not met in almost all common use cases (neglecting scientific use cases).

When near field conditions occur, the object cannot be approximated as a point target and the dimensions of the object must be considered.

Moreover, monostatic radar sensors only allow for measuring a total amount of energy being reflected by an object towards the sensor. From this amount no information can be derived as to the exact position or dimensions of the object. Spoken differently, based on a monostatic radar sensor it remains undeterminable how detected scattering centers are distributed within the coverage area of the radar sensor, how the partial contributions of different scattering centers to the total amount of reflected energy is, how much energy is reflected by different areas of a detected object, and how the distribution of scattering centers change if the distance between the radar sensor and the object changes.

Accordingly, there exists a need for providing a radar sensing technique allowing to better characterize the detected object with regard to its reflection properties and with regard to its properties relative to the radar sensor, for example under near field conditions.

SUMMARY

The subject matter according to the independent claims serves the respective need or others. Additional embodiments are indicated within the dependent claims and the following description, each of which, individually or in combination, may represent aspects of the disclosure. Some aspects of the present disclosure are presented with regard to methods, others with regard to respective devices. However, the features are correspondingly to be transferred vice versa.

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below.

According to an aspect, some embodiments of the disclosure generally relate to a multistatic radar system for a spatially resolved detection of an object under test. In an embodiment, the multistatic radar system (MRS) includes an at least two-dimensional multistatic array of antenna elements having an at least partially shared coverage area. The MRS also comprises at least one data processing circuit coupled to the at least two-dimensional multistatic array. The at least one data processing circuit is configured to perform analog and/or digital beamforming. At least one image of the object under test at least partially being located within the at least partially shared coverage area is obtained by the at least one data processing circuit. Moreover, the at least one data processing circuit is configured to process the image obtained to resolve at least one scattering center of the object under test. Also, the at least one data processing circuit is configured to determine a spatially resolved scattering center distribution of the at least one scattering center based on the at least one image obtained.

Within the present context, an image of the object under test may be regarded a representation of the object under test including spatially resolved reflection intensities. The representation depends on the distance between the two-dimensional multistatic array of antenna elements and the object under test. The representation may be two-dimensional (surface-based) or three-dimensional (volume-based). However, the later one is preferred such that a volume-based representation of the object under test is provided according to three orthogonal directions of a Cartesian coordinate system.

Generally, the volume-based representation of the object under test can be provided due to the two-dimensional multistatic array of antenna elements that provides antenna elements in at least two dimensions. In other words, the antenna elements may be arranged in column(s) and row(s) within a plane.

Each of the at least two channels may be associated with one of the at least two transmission antenna elements. Likewise each of the at least two channels may be associated with one of the at least two reception antenna elements. Using an at least two-dimensional multistatic array enables resolving at least one scattering center of the object under test not only according to far field conditions but also with regard to near field conditions. Therefore, even if the object under test may not be approximated as a point target anymore, since the distance of the object under test to the MRS is too small for this approximation, the scattering center distribution may be reliably spatially resolved due to the two-dimensional multistatic array. Put differently, the at least one scattering center of the object under test may be determined with regard to arbitrary relative positions of the object under test in view of the two-dimensional multistatic array.

This is contrary to prior art detection approaches focusing on solely detecting an object under test based on the total amount of energy reflected by the object under test towards the antenna array. As such prior art approaches only allow to identify the object's reflection properties in the direction of the detection antenna, they fail to provide any precise information with regard to the object's dimensions and position as well as partial contributions.

Since the scattering center distribution is determined in a spatially resolved fashion, the disclosed techniques and methodologies allow to determine partial contributions of different areas of the object under test. Also, the distribution of scattering centers located within the at least partially shared coverage area may be determined per se.

The scattering center distribution may be considered a spatially resolved distribution of scattering centers of an arbitrary large object. Spoken differently, the arbitrary large object is resolved into equivalent currents on the object's surface which radiate electromagnetic waves according to Huygen's principle. For instance, the method of moments may be applied in this regard. Put simply, in view of the two-dimensional multistatic array of antenna elements the moments on the object's surface can be derived with high resolution.

Furthermore, if a forward operator (field propagator) is applied to the moments, the field in an arbitrary distance may be obtained. Increasing the distance to infinity gives the real radar cross section (RCS) value.

Moreover, the partial contributions of different scattering centers located within the at least partially shared coverage area may be determined. These advantages are achieved though the distance between the antenna array and the object under test may generally vary upon the detection procedure.

For example, the MRS may be installed on a vehicle and one or multiple scattering centers may be detected in front/rear of the vehicle during a forward/rearward motion. As the detection mechanism is strongly dependent on the incident angles between the antenna array and the object under test (which optionally itself may be moving within the at least partially shared coverage area), the reliability of detecting one or multiple scattering centers is also improved with regard to both, the dimensions and positions of the underlying one or multiple objects.

This scenario generally relates to carrying the multistatic radar system around, e.g., by use of a vehicle, and determining the strongest scattering centers of an arbitrary scenery. For instance, when driving through an avenue with trees, each tree will be recorded as a scattering center. Accordingly, the dynamic information obtained will be utilized for characterizing usual traffic scenarios.

Alternatively, another possible scenario relates to moving the object under test, e.g., on a turntable, while keeping the multistatic radar system static such that a full three-dimensional scattering center representation of the object under test is obtained, for example for every incident angle in azimuth.

Furthermore, since beamforming techniques do not focus with regard to single points in space but instead to directions relative to reception antenna elements the amount of computational efforts may be substantially reduced. Fast Fourier transform (FFT) algorithms may be applied to determine the direction showing maximum scattering center distributions. Thus, when compared to microwave imaging techniques applying millimeter wavelengths, the speed and complexity of the analysis may be reduced.

Optionally, the at least two-dimensional multistatic array may comprise at least two transmission antenna elements and/or at least two reception antenna elements. Hence, a single-input and multiple-output (SIMO), a multiple-input and single-output (MISO) or a multiple-input and multiple-output (MIMO) antenna array may be established.

The respective antenna elements provide (virtual) channels among each other. For instance, a MIMO multistatic array with ten reception antenna elements and ten transmission antenna elements has 100 (virtual) channels. An equivalent SIMO multistatic array has one reception antenna element and 100 transmission antenna elements. In a similar manner, an equivalent MISO multistatic array has 100 reception antenna elements and one transmission antenna element. Obviously, the MIMO multistatic array is preferred while having a total number of 20 antenna elements compared to 101 antenna elements in case of the MISO or rather SIMO multistatic array.

In any case, the two-dimensional multistatic array may have at least two channels, e.g., at least one reception antenna element and at least two transmission antenna element or rather at least two reception antenna elements and at least one transmission antenna element.

By using multiple transmission antenna elements and multiple reception antenna elements, the object under test may be investigated using digital beamforming techniques (spatial filtering) such that the at least one scattering center and therewith the underlying one or multiple objects under test may be precisely localized and identified with regard to its dimensions and position based on an applied angular resolution approach. Hence, the correct characterization of the object under test is improved in view of prior art approaches with regard to multiple aspects.

Additionally, the MRS may comprise a user interface coupled to the at least one data processing circuit. The at least one data processing circuit may then be configured to forward the spatially resolved scattering center distribution to the user interface. For example, the user interface may be configured to provide a visual and/or haptic and/or noise based indication of the spatially resolved scattering center distribution. Accordingly, a user may be provided with a more sophisticated representation of the at least one scattering center and/or the object under test such that the user is enabled to more appropriately handle the detection scheme.

Furthermore, the at least one data processing circuit may be configured to determine the spatially resolved scattering center distribution at different distances based on the at least one image obtained. In other words, multiple images may be obtained during a relative movement between the MRS and the object under test. Based on these multiple images a distance dependence may be included when determining the spatially resolved scattering center distribution. Consequently, more specialized information with regard to the object under test may be provided. For example, a movement of the object under test relative to the MRS may be determined. Optionally, this movement may be indicated to a user, for example using the user interface.

Generally, the at least one data processing circuit together with the user interface may ensure to provide an RCS far-field value, an RCS equivalent near-field value and/or the resolved scattering power distribution image. Hence, the user may choose between different information.

Also, at least one reference reflector is provided that has a predetermined radar cross section. The reference reflector corresponds to a known scatterer, e.g., a reference sphere with a known radar cross section, for example an absolute radar cross section that was analytically determined (previously). Moreover, the at least one reflector may represent a database which comprises information with regard to known scatterer(s) for which the absolute RCS value is analytically known.

According to an example, the absolute RCS far-field value of a reference sphere may be analytically determined. Then, the analytical value may be utilized to reference the relative scattering center distribution determined in view of the corresponding reference reflector (sphere). Subsequently, an absolute RCS far-field value of the object under test is determined based on the spatially resolved scattering center distribution and the predetermined absolute RCS far-field value of the reference reflector, namely the known scatterer.

Put differently, the reference reflector enables not only to determine relative radar reflection properties but also absolute radar reflection properties as well. Accordingly, additional information may be acquired and used in secondary evaluation processes, such as during a subsequent classifying process with regard to the underlying object under test.

Additionally, the MRS may further comprise a data storage medium coupled to the at least one data processing circuit. Then, at least the spatially resolved scattering center distribution may be stored therein. Therefore, offline evaluation of the determined spatially resolved scattering center distribution is optionally provided.

Further, a radar target simulator may be operated to play back the recorded scattering center distribution which, thus, could be included in training simulations, such as used within a vehicle simulator device or rather for training/testing radar sensors. For example, a point cloud of scattering centers, either being clustered to a large object, or individual points may be played back.

Optionally, the multistatic radar system may be configured to measure a cross-polarization of a detected electromagnetic wave reflected by the object under test. Accordingly, the at least one data processing circuit may be configured to determine polarimetric information of the object under test based on, firstly, the measured cross-polarization and, secondly, polarization information of electromagnetic waves transmitted by at least one transmission antenna elements, e.g., at least one transmission antenna element of the at least two transmission antenna elements. Since the polarization of the electromagnetic waves transmitted by the at least two transmission antenna elements is known per se (at least if respective devices are applied), the detected cross-polarization enables to better characterize the object under test with regard to its polarization properties, namely with regard to its circular and/or linear and/or elliptical polarization properties. This generally provides the possibility to distinguish between different detection scenarios such as detected electromagnetic waves following beam paths including multiple reflections.

In case of multiple scattering centers located within the at least partially shared coverage area, a spatially resolved scattering center distribution may be determined for a selected scattering center by the at least one data processing circuit based on a user input received by a user interface. That is, if the data processing circuit detects multiple scattering centers within the at least partially shared coverage area, the data processing circuit may provide a notification to a user interface. In response to the notification, the user may select a specific scattering center for which the spatially resolved scattering center distribution is subsequently determined. For example, the multiple scattering centers could emerge from different objects under test at least partially located within the at least partially shared coverage area.

Optionally, a notification may depend on a relative distance between the multiple scattering centers. Put differently, only if a distance between the multiple scattering centers located within the at least partially shared coverage area equals or exceeds a predetermined threshold value, a notification provided to a user interface may be triggered. Hence, unwanted notification scenarios where multiple scattering centers are considered to belong to a single object under test may be avoided.

The entire MRS or at least the at the least two-dimensional multistatic array of antenna elements may be portable. In some embodiments, the MRS may not necessarily require a testing area provided by an anechoic chamber. The anechoic chamber may be avoided in view of the underlying angular detection mechanism used to determine the scattering center distribution. For example, the MRS may be implemented into a vehicle to keep at least part of a surrounding of the vehicle under surveillance. In some embodiments, a surrounding according to a general direction of forward and/or reverse motion of the vehicle may be kept under surveillance. In some embodiments, the at least partially shared coverage area may be established according to the general direction of forward and/or reverse motion of the vehicle. In an alternative, multiple MRSs, optionally sharing a data processing circuit, may be included in a vehicle to simultaneously keep different parts of the surrounding under surveillance.

Moreover, the at least one data processing circuit may be configured to determine at least a horizontal and/or a vertical polarization of electromagnetic waves received by at least one reception antenna element upon a variation of a polarization axis of electromagnetic waves transmitted by at least one transmission antenna element. In some embodiments, the at least one data processing circuit may be configured to determine any desired slanted polarization of electromagnetic waves received by at least one reception antenna element upon a variation of a polarization axis of electromagnetic waves transmitted by at least one transmission antenna element. Caused by the polarimetric properties of an object under test, at least partially located within the at least partially shared coverage area, an interaction may occur between the object and the incident electromagnetic waves transmitted by at least one transmission antenna element. As a consequence, the polarization angle of the electromagnetic waves reflected by the object under test may be different compared to the polarization angle of the incident electromagnetic waves. This provides the possibility to determine the polarization properties of the object under test if the polarization properties of the electromagnetic waves received by at least one reception antenna element and the polarization properties of the electromagnetic waves transmitted by at least one transmission antenna element are taken into account.

The polarization axis of the electromagnetic waves transmitted by at least one transmission antenna element and/or at least one transmission antenna element itself may be rotatable. Also, the entire MRS may be rotatable. For example, the polarization axis of the transmitted electromagnetic waves or the available range of angular rotation of the at least one transmission antenna element may correspond to a range between +45° and −45° with regard to a reference point at 0°, e.g., a horizontal plane. In some embodiments, the range may also be between +90° and −90° with regard to the reference point. Accordingly, the polarization properties of the object under test may be easily determined if upon rotation of a polarization axis and/or rotation of at least transmission antenna element the polarization properties of electromagnetic waves received by at least one reception antenna element, e.g., at least one reception antenna element of the at least two reception antenna elements are detected.

Optionally, the MRS may have a fixed spatial arrangement and the object under test may be rotatable relative to the MRS. For example, the MRS may be placed on a rotating device such as a turntable. Even further, the object under test may be rotatable with regard to multiple directions relative to the MRS. Then, advanced scattering center distribution properties may be acquired, including information on polarimetric properties of the object under test.

The at least one data processing circuit may also be configured to classify the at least one scattering center with regard to at least one of an object type, a characteristic of the object under test and a threat level based on the determined spatially resolved scattering center distribution. In this regard, the object type may for example be one of a human being, animal, and an item, e.g., another vehicle or a tree. The characteristic of the object may for example refer to moving or non-moving objects. The threat level may for example indicate whether the at least one scattering center is believed to remain within a direction of motion of the MRS. In other words, the threat level may exemplarily indicate whether a risk for a collision is believed to occur or to be present.

The determined classification properties of the at least one scattering center may be provided to secondary components such as control circuits which may, for example, initiate an emergency breaking of a vehicle comprising the MRS.

According to another aspect, some embodiments of the disclosure generally relate to a method for spatially resolved detection of an object under test. In an embodiment, the method includes the step of providing an at least two-dimensional multistatic array of antenna elements having an at least partially shared coverage area. Also, the method comprises the step of performing analog and/or digital beamforming using at least one data processing circuit coupled to the at least two-dimensional multistatic array. Thereby, at least one image of the object under test at least partially being located within the at least partially shared coverage area is obtained. Moreover, the method comprises the step of processing the image to resolve at least one scattering center of the object under test. Additionally, the method includes the step of determining a spatially resolved scattering center distribution based on the at least one image obtained.

The method provides several advantages, among others, which have been explained hereinbefore with regard to the corresponding multistatic radar system. In short, the scattering center may be characterized with regard to several radar related properties, such as the center's location, dimensions of an object under test underlying the at least one scattering center, the partial contributions of different areas of the underlying object, the distribution of multiple scattering centers within the at least partially shared coverage area, and the partial contributions of different scattering centers identified. Moreover, these characteristics may be reliably determined though the relative positions between the underlying one or multiple objects under test and the two-dimensional multistatic array of antenna elements may vary over time.

In some examples, the at least two-dimensional multistatic array may comprise one reception antenna element and at least two transmission antenna elements such that at least two channels are provided. Hence, a SIMO antenna array is provided. Further, the at least two-dimensional multistatic array may comprise at least two reception antenna elements and one transmission antenna element such that at least two channels are provided. Hence, a MISO antenna array is provided. Moreover, the at least two-dimensional multistatic array may comprise at least two reception antenna elements and at least two transmission antenna elements. Thereby, a multiple-input and multiple-output (MIMO) antenna array may be established.

Optionally, the method may also comprise the step of forwarding the spatially resolved scattering center distribution to a user interface coupled to the at least one data processing circuit. Thus, the user interface may be used to indicate the determined distribution of the spatially resolved scattering center distribution to a user so that the user is enabled to act accordingly. For example, the distribution may be represented as visual information indicating the position and/or dimensions of the one or multiple scattering centers and/or the underlying objects under test.

In some embodiments, the method may include the step of determining the spatially resolved scattering center distribution at different distances based on the at least one image obtained. Since the image may comprise at least two-dimensional or also three-dimensional information according to a Cartesian coordinate system, a distance-dependence may be obtained. Optionally, this distance-dependence may be indicated to a user using a user interface.

Alternatively, the method may comprise the step of determining an absolute RCS far-field value of the object under test based on the spatially resolved scattering center distribution and a predetermined absolute RCS far-field value of a reference reflector.

Accordingly, additional information may be acquired and used in secondary evaluation processes, such as during a subsequent classifying process with regard to the underlying object under test.

Optionally, the method may include the step of storing at least the spatially resolved scattering center distribution within a storage medium coupled to the at least one data processing circuit. This enables offline usage of the stored information, for example for simulating respective radar scenarios.

Furthermore, the method may comprise the step of measuring a cross-polarization of a detected electromagnetic wave reflected by the object under test. Accordingly, the method may also comprise the step of determining polarimetric information of the object under test based on the measured cross-polarization and polarization information of electromagnetic waves transmitted by at least one of the transmission antenna element, e.g., at least one of the at least two transmission antenna elements. Thus, the at least one scattering center may also be evaluated with regard to its polarization related properties. This can be used to identify different scattering scenarios.

Alternatively or additionally, the method may also comprise the step of receiving a user input received by a user interface in case of multiple scattering centers being located within the at least partially shared coverage area. The method may then also comprise the step of determining a spatially resolved scattering center distribution based on the user input. If multiple scattering centers are identified the user may thus select a specific scattering center being of primary interest. For example, this scattering center may be located closer to a direction of motion of the MRS which may be portably arranged with a vehicle.

In some embodiments, the method may comprise the step of determining at least a horizontal and/or a vertical polarization of electromagnetic waves received by at least one reception antenna element, e.g., one of the at least two reception antenna elements, upon a variation of a polarization axis of electromagnetic waves transmitted by at least one transmission antenna element, e.g., one of the at least two transmission antenna elements. Accordingly, the at least one scattering center may be further characterized.

In some embodiments, the method may comprise the step of classifying the at least one scattering center with regard to at least one of an object type, a characteristic of the object under test and a threat level based on the determined spatially resolved scattering center distribution. Thus, a respective classification result may be obtained which allows to more appropriately react on the at least one determined scattering center.

Generally, the distribution of the scattering centers may change based on the incident angle of the transmit signal and the distance between the multistatic radar system and the object under test. However, the distribution of scattering centers can be resolved such that any changes are detected appropriately. In some embodiments, the distribution of the scattering centers can be used to create unique patterns. Afterwards, these unique patterns can be used to classify the object, e.g., in autonomous driving applications.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 is a schematic drawing of a method for spatially resolved detection of an object under test according to an embodiment of the disclosure; and FIG. 5 is a schematic drawing of a method for spatially resolved detection of an object under test according to an embodiment of the disclosure.

DETAILED DESCRIPTION

Figure 1:
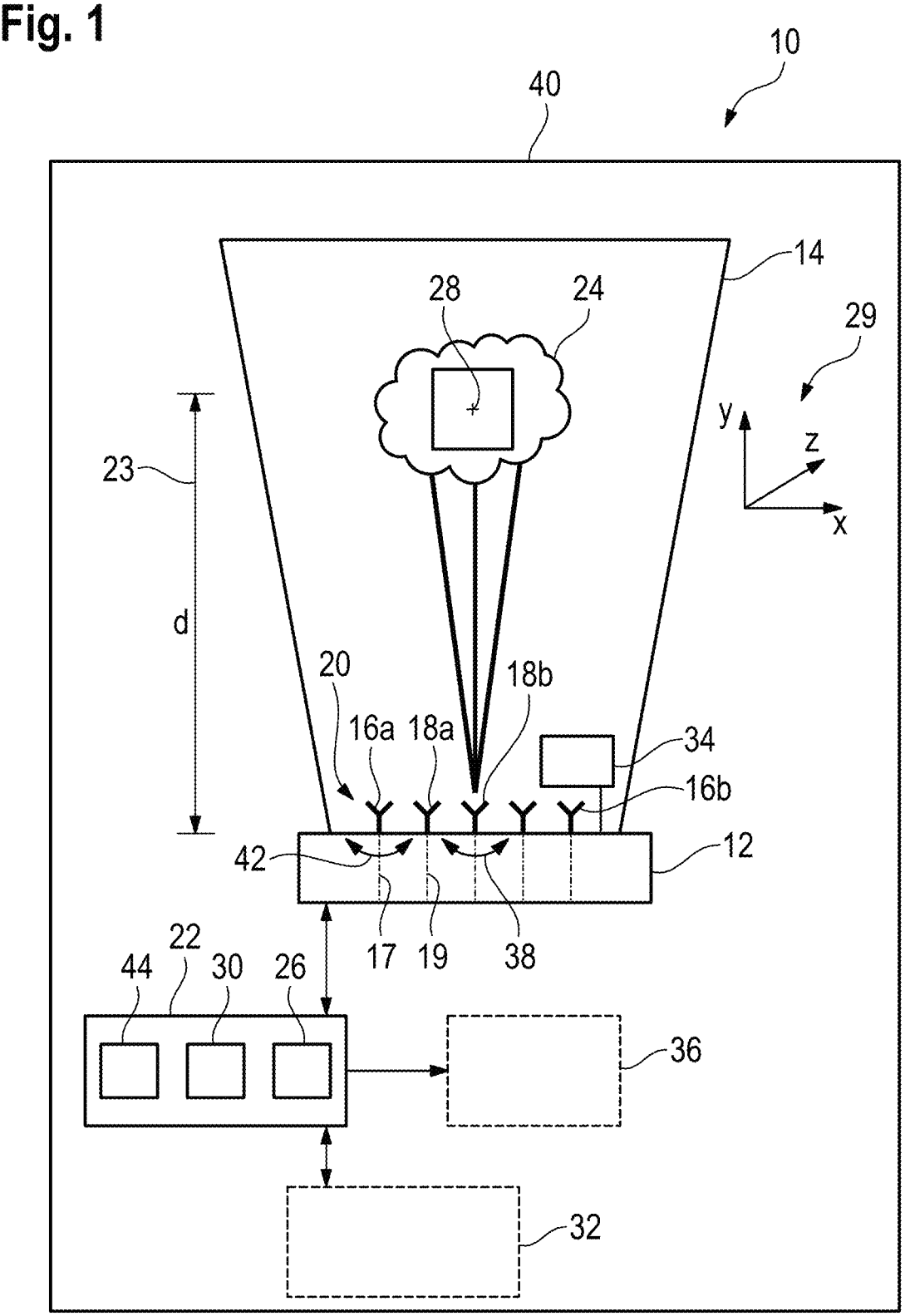
FIG. 1 is a schematic drawing of a multistatic radar system according to an embodiment of the disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps. Any of the features disclosed hereinafter with respect to the example embodiments and/or the accompanying FIGURES can alone or in any sub-combination be combined with features of the aspects of the present disclosure FIG. 1 is a schematic drawing of a multistatic radar system (MRS) 10 according to an embodiment of the present disclosure. As shown in FIG. 1, the MRS 10 comprises an at least two-dimensional multistatic array 20 of antenna elements. Generally, the at least two-dimensional multistatic array 20 may be established as a single-input and multiple-output (SIMO) antenna array, a multiple-input and single-output (MIMO) antenna array or rather a multiple-input and multiple-output (MIMO) antenna array as will be described later in more detail.

According to some examples, the at least two-dimensional multistatic array 20 of antenna elements comprises multiple-input and multiple-output (MIMO) antenna array 12. The MIMO antenna array 12 includes at least two transmission antenna elements, namely at least a first transmission antenna element 16a and a second transmission antenna element 16b. Furthermore, the MIMO antenna array 12 includes at least two reception antenna elements, namely at least a first reception antenna element 18a and a second reception antenna element 18b.

Each transmission antenna element 16a, 16b is associated with at least one transmission channel 17 and each reception antenna element 18a, 18b is associated with at least one reception channel 19 of the MIMO antenna array 12. In view of the transmission antenna elements 16a, 16b and the reception antenna elements 18a, 18b the MIMO antenna array 12 establishes an at least two-dimensional multistatic array 20 of antenna elements. Generally, the antenna elements 16a, 16b, 18a, 18b generate channels among each other. Different numbers of transmission antenna elements 16a and/or reception antenna elements 18a and the channels associated thereto of the MIMO antenna array 12 are also within the scope of the present disclosure. The present example is only for illustrative purposes.

Generally, the antenna elements 16, 18 may be arranged in an at least two dimensional manner, namely in column(s) and row(s). For instance, a line of transmission antenna elements 16 is provided that has adjacent lines of reception antenna elements 18. Hence, lines of transmission antenna elements 16 and reception antenna elements 18 may be arranged in a plane in an alternating manner.

Including the transmission and reception antenna elements 16a, 16b, 18a, 18b, the two-dimensional multistatic array 20 of antenna elements comprises an at least partially shared coverage area 14. The at least partially shared coverage area 14 is at least partially subject to electromagnetic waves transmitted by the transmission antenna elements 16a, 16b and corresponds to an area from which electromagnetic waves may be received by the reception antenna elements 18a, 18b. Generally, the MIMO antenna array 12 may also comprise additional transmission and/or reception antenna elements as indicated above. The MRS 10 also includes at least one data processing circuit 22 being coupled to the at least two-dimensional multistatic array 20 of the MIMO antenna array 12, for example via the respective transmission channel(s) 17 and the respective reception channel(s) 19.

The data processing circuit 22 is configured to perform analog and/or digital beamforming. Via beamforming generally determining of a position of a scattering center reflecting the electromagnetic waves received by the reception antenna elements 18a, 18b is possible. This is achieved by evaluating multiple received electromagnetic waves with regard to their individual time offsets (phases) caused by their different distances 23 (d) covered. The determining procedure is improved since the reflected electromagnetic waves are caused by different electromagnetic waves being transmitted by different transmission antenna elements 16a, 16b. Therefore, the variety of the scattering events is enhanced which generally allows to more precisely investigate the at least partially shared coverage area 14.

Based on the beamforming procedure the data processing circuit 22 obtains an image 26 of the object under test 24 at least partially being located within the at least partially shared coverage area 14. The image 26 represents an at least two-dimensional, In some embodiments three-dimensional representation, of the object under test 24 with regard to its spatially resolved reflection intensities.

The data processing circuit 22 is also configured to process the image 26 obtained in order to resolve at least one scattering center 28 of the object under test 24. Put differently, the data processing circuit 22 may evaluate at least one scattering center 28 which may form a basis for the image 26 obtained. The at least one scattering center 28 may be determined with regard to a position, and/or distance 23 (d) and/or shape for example with regard to dimensions according to a Cartesian coordinate system 29.

In some embodiments, a spatially resolved scattering center distribution 30 based on the at least one image 26 is determined by the at least one data processing circuit 22. Accordingly, a quantity is determined by the at least one data processing circuit 22 which provides a measure to describe the object under test's 24 ability to reflect an incident electromagnetic wave transmitted by the transmission antenna elements 16a, 16b.

The MRS 10 provides the possibility to reliably determine the scattering center distribution 30 not only according to far field conditions but also at distances at which the object under test 24 may not be approximated as a point target anymore, namely under near field conditions.

The determination does not rely on the assumption that the transmitted electromagnetic waves are electromagnetic plane waves. The MIMO antenna array 12 having multiple transmission antenna elements 16a, 16b and multiple reception antenna elements 18a, 18b provides to the ability to triangulate the at least one scattering center 18 and the underlying object under test 24 using the angular resolution of the at least two-dimensional multistatic array 20 of antenna elements.

The MRS 10 may optionally comprise at least one user interface 32 which may be coupled to the at least one data processing circuit 22. Accordingly, the at least one data processing circuit 22 may provide several information to the at least one user interface 32, such as the image 26 obtained and/or the spatially resolved scattering center distribution 30. Also, the connection between the at least one data processing circuit 22 and the at least one user interface 32 may be bidirectional. That means that the at least one data processing circuit 22 can also receive commands inputted by a user at the at least one user interface 32. For example, a user input may be received in response to a notification provided to the at least one user interface 32 by the at least one data processing circuit 22.

In some embodiments, a reference reflector 34 may be optionally provided, e.g., used beforehand. The reference reflector 34 may comprise a predetermined radar cross section (RCS) far-field value, e.g., an absolute value known. For example, the absolute RCS far-field value may be analytically determined, such as for a sphere. Then, the analytical value may be utilized to reference the relative scattering center distribution 30 determined in view of a corresponding reference reflector 34 (sphere) to the absolute reference reflector 34 investigated. This relationship may be applied to determine absolute RCS far-field values of arbitrary objects under test 24 based on the initially determined scattering center distribution 30.

Moreover, the MRS 10 may comprise a storage medium 36. The storage medium 36 may be coupled to the at least one data processing circuit 22. Within the storage medium 36, information determined by the at least one data processing circuit 22 may be stored, such as for example the spatially resolved scattering center distribution 30. In some embodiments, one or more program modules, computer program instructions, engines, etc., may be stored in the storage medium, and processed by the data processing circuit 22 in order to carry out the functionality of the data processing circuit set forth herein.

The stored information may be used offline to further evaluate the data and/or for example to replay the stored information, e.g., by a radar simulator used for testing radar devices by simulating a certain scenario. The respective scenario may be at least partially provided by the stored information that can be replayed accordingly. Thus, the stored information may be used to simulate specific radar configurations.

According to another aspect, the polarization axis of the at least first and second transmission antenna elements 16a, 16b may be rotatable by a rotating device 42.

Alternatively or cumulatively, the at least first and second transmission antenna elements 16a, 16b may be rotatable themselves by the rotating device 42. Thereby, the polarization of electromagnetic waves transmitted by the at least first and second transmission antenna elements 16a, 16b may be influenced, for example with regard to respective polarization axes.

Based on the interaction with the object under test 24, for example with the at least one scattering center 28, the polarization of the electromagnetic waves reflected by the object under test 24 may be altered. The at least first and second reception antenna elements 18a, 18b may then be configured to detect a cross-polarization and/or a horizontal polarization and/or a vertical polarization of the received electromagnetic waves. In this regard, a polarization detection device 38 may be applied. Consequently, the at least one scattering center 28 and/or the underlying object under test 24 may be evaluated also with regard to its polarimetric information 44.

The MRS 10 as a whole may comprise a housing 40, thereby establishing a portable multistatic radar system 10. In other words, the MRS 10 does not rely on an anechoic chamber, although an anechoic chamber may be present. Also, the MRS 10 may be arranged at least partially within an anechoic chamber. For example, the two-dimensional multistatic array 20 of antenna elements may be arranged inside an anechoic chamber. Alternatively, the MRS 10 may be located at a vehicle and, thus, be applied in mobile applications.

Based on the determined information with regard to the at least one scattering center 28 of the underlying object under test 24, the at least one scattering center 28 may be classified by the at least one data processing circuit 22. In particular, the classification procedure may include a classification with regard to at least one of an object type, a characteristic of the object under test and a threat level based on the determined spatially resolved scattering center distribution. Hence, the object under test 24 may for example be classified as moving or non-moving object, as potential threat for the MRS 10 since it may be determined that a collision may potentially occur, and with regard to a type of an object, such as a human, animal and/or item.

Figure 2:
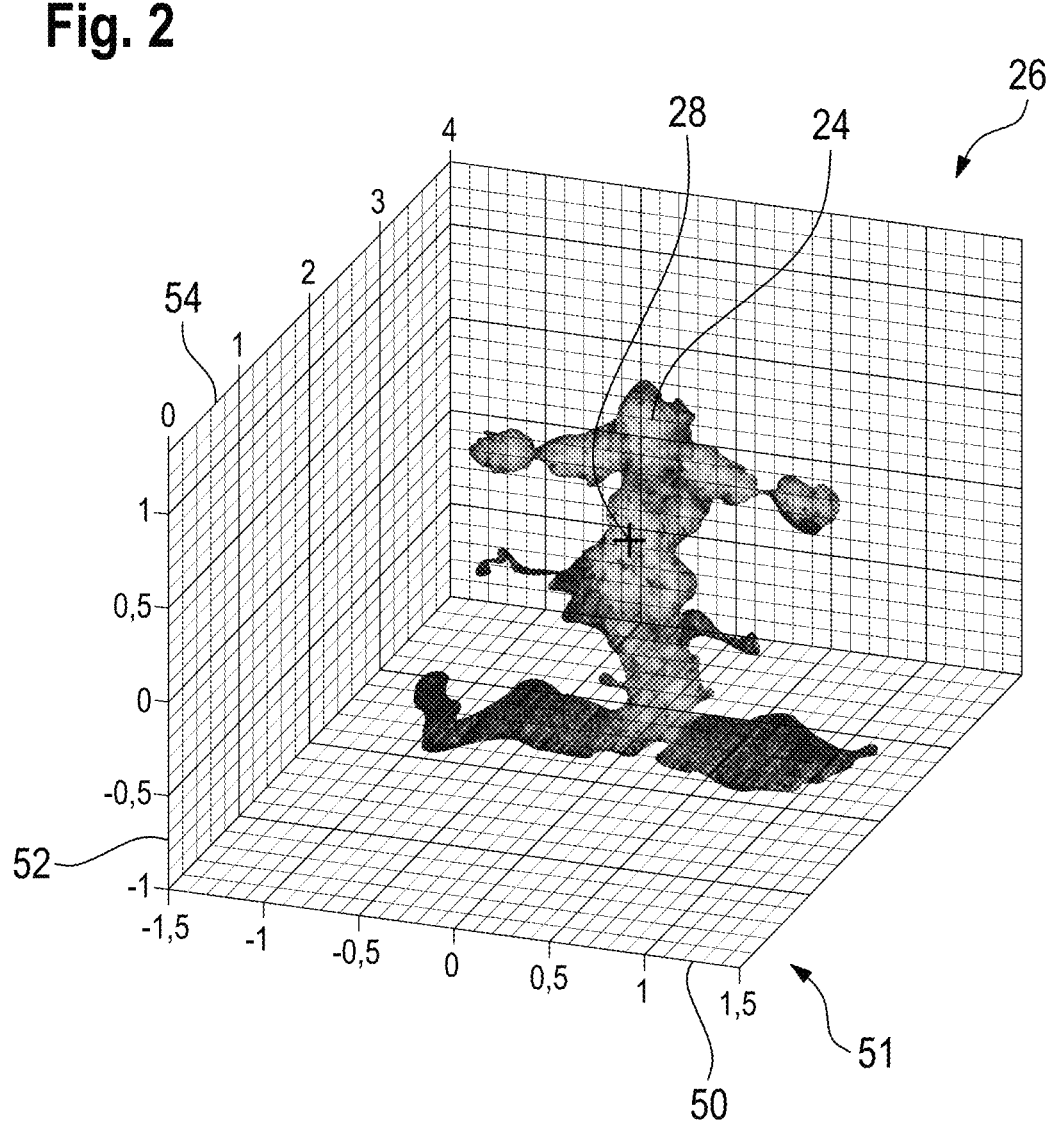
FIG. 2 is a schematic drawing of an example of an image of the object under test obtained by an example of the at least one data processing circuit.

FIG. 2 is a representative schematic drawing of an image 26 of the object under test 24 obtained by the at least one data processing circuit 22. As shown in FIG. 2, a human has been detected accordingly.

The image 26 may comprise spatially resolved information which may be regarded a three-dimensional (volume-based) representation of reflection intensities of different portions of the underlying object under test 24 according to a three-dimensional Cartesian coordinate system 51. The reflection intensities relate to different grey or rather color scales in the image.

Accordingly, the reflection intensities are spatially resolved with regard to an X-axis 50, a Y-axis 52, and a Z-axis 54 of the coordinate system 51, thereby providing a volumetric image of the object under test 24.

The spatial resolution is based on the beamforming procedure applied by the at least one data processing circuit 22 in conjunction with the transmission and reception channels 17, 19 of the MIMO antenna array 12. Based on this information, the at least one data processing circuit 22 may determine a spatially resolved scattering center distribution 30. The image 26 may also be used to determine and/or resolve a position of at least one scattering center 28 and/or a shape of the object under test 24.

Figure 3:
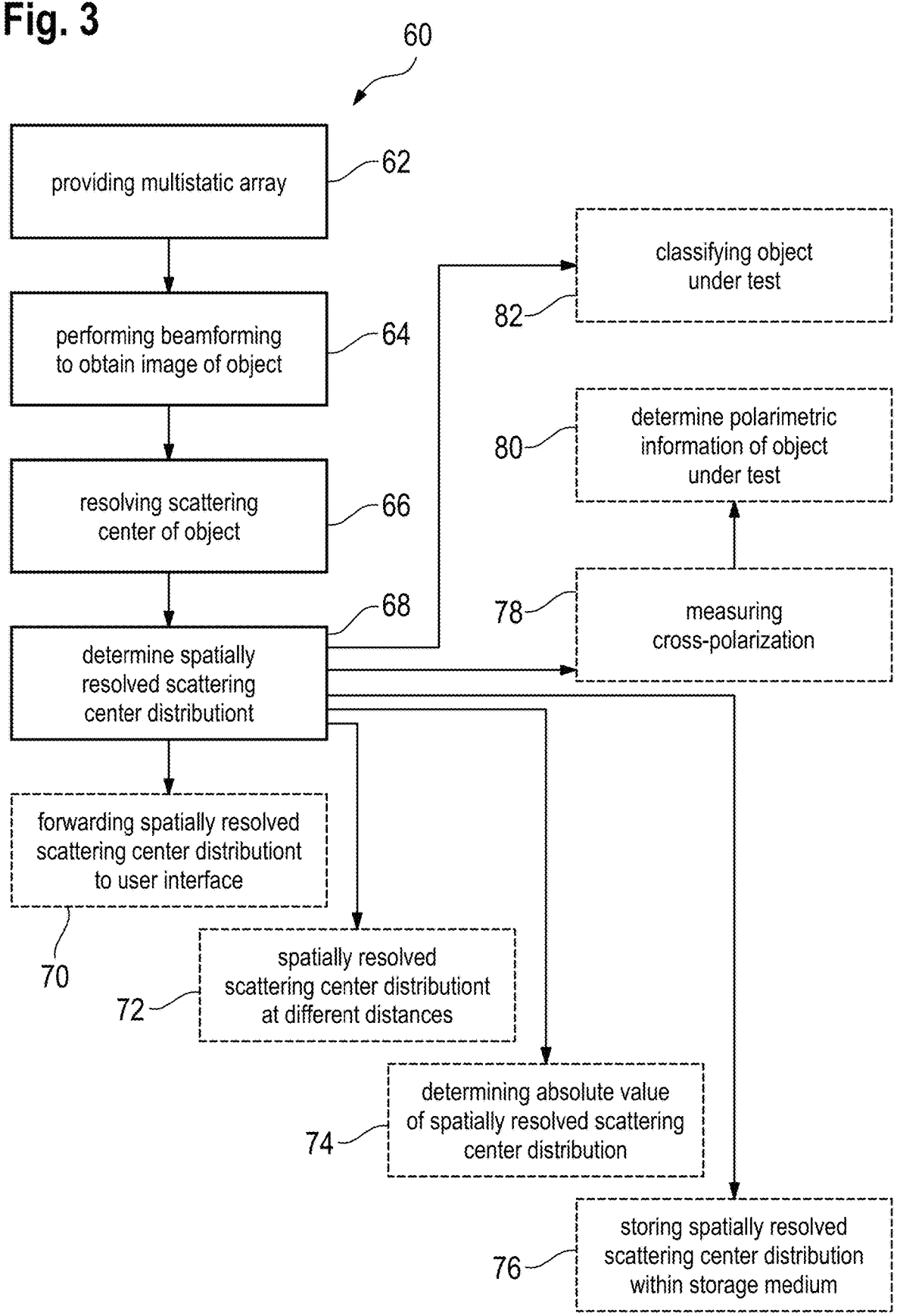
FIG. 3 is a schematic drawing of a representative method for spatially resolved detection of an object under test according to an embodiment of the disclosure.

FIG. 3 is a schematic drawing of a representative method 60 for spatially resolved detection of an object under test 24 according to an embodiment. Some aspects of the method 60 have been explained hereinbefore with regard to devices, such as the MRS 10. The aspects are to be correspondingly transferred.

The method 60 comprises the initial step 62 of providing an at least two-dimensional multistatic array 20 of antenna elements 16, 18. The antenna elements 16, 18 have an at least partially shared coverage area 14. Optionally, the at least two-dimensional multistatic array 20 comprises at least two transmission antenna elements 16a, 16b and at least two reception antenna elements 18a, 18b such that at least two transmission channels 17 and at least two reception channels 19 are provided. Thereby, a multiple-input and multiple-output (MIMO) antenna array 12 may be established.

The method 60 comprises the subsequent step 64 of performing analog and/or digital beamforming using the at least one data processing circuit 22 coupled to the at least two-dimensional multistatic array 20. Thereby, at least one image 26 of the object under test 24 at least partially being located within the at least partially shared coverage area 14 is obtained.

The method 60 further comprises the step 66 of processing the image 26 to resolve the at least one scattering center 28 of the object under test 24. The method 60 comprises the step 68 of determining the spatially resolved scattering center distribution 30 based on the at least one image 26 obtained.

The method 60 may comprise several additional steps, which, however, are optional. These steps are indicated using dashed boxes.

For example, the method 60 may comprise the optional step 70 of forwarding the spatially resolved scattering center distribution 30 to the user interface 32 coupled to the at least one data processing circuit 22. Then, the spatially resolved scattering center distribution 30 may be indicated to a user. For example, the user interface 32 may comprise a display device in this regard. In some embodiments, the image 26 of the object under test 24 may also be provided to the user interface 32. Within the image 26, the at least one scattering center 28 may be indicated. Also, additional information such as a position and/or a shape and/or a moving direction of the object under test 24 may be indicated to the user.

In some embodiments, the method 60 may comprise the optional step 72 of determining the spatially resolved scattering center distribution 30 at different distances 23 (*d*) based on the at least one image 26 obtained. Therefore, the object under test 24 may be better characterized including volume-based information of the scattering center distribution 30.

Alternatively or cumulatively, the method 60 may comprise the optional step 74 of determining an absolute RCS far-field value of the object under test 24 based on the spatially resolved scattering center distribution 30 and a relationship determined in view of a reference reflector 34. Hence, absolute RCS far-field values may be obtained which assists in better characterizing the object under test 24. Secondary conclusions on the respective detection scenarios may be made with improved accuracy.

Moreover, the method 60 may comprise the optional step 76 of storing at least the spatially resolved scattering center distribution 30 within a storage medium 36 coupled to the at least one data processing circuit 22. The stored spatially resolved scattering center distribution 30 values may then be used in secondary evaluation or simulation procedures.

Furthermore, the method 60 may comprise the optional step 78 of measuring a cross-polarization of a detected electromagnetic wave reflected by the object under test 24. In this regard, the reception antenna elements 18a, 18b may be applied. For example, the reception antenna elements 18a, 18b of the MIMO antenna array 12 may have polarization detection devices 38 associated thereto which enable to detect the cross-polarization of electromagnetic waves received by the reception antenna elements 18a, 18b. The optional step 78 may optionally also be conducted prior to step 64 or step 66.

In conjunction with the optional step 78, the method 60 may comprise the optional step 80 of determining polarimetric information of the object under test 24 based on the measured cross-polarization when taking the polarization information of electromagnetic waves transmitted by at least one of the at least two transmission antenna elements 16a, 16b into account. Since the polarization of the electromagnetic waves transmitted by the transmission antenna elements 16a, 16b of the MIMO antenna array 12 is predetermined, the polarimetric information of the object under test 24 may be determined due to detecting the cross-polarization of the electromagnetic waves received by the reception antenna elements 18a, 18b. Hence, the object under test 24 may be further characterized with regard to additional aspects. Also, the evaluation may be used to identify specific radar reflection events such as beam paths including multiple reflections.

According to another aspect, the method 60 may comprise the optional step 82 of classifying the at least one scattering center 28 with regard to at least one of an object type, a characteristic of the object under test and a threat level based on the determined spatially resolved scattering center distribution 30. Thus, a more sophisticated evaluation of the at least one scattering center 28 may be provided which is usable in corresponding reaction schemes.

FIG. 4 is a schematic drawing of a representative method 90 for spatially resolved detection of an object under test according to an embodiment. Some aspects of the method 90 have been explained hereinbefore with regard to devices, such as the MRS 10. The aspects are to be correspondingly transferred. The method 90 may comprise individual steps previously described with regard to method 60. Repeated explanation of these steps is omitted. Also, method 90 may be (sub)-combined with at least one of the optional steps disclosed in view of method 60.

However, method 90 comprises the optional step 100 of determining at least a horizontal and/or a vertical polarization of electromagnetic waves received by at least one of the at least two reception antenna elements 18a, 18b upon a variation of a polarization axis of electromagnetic waves transmitted by at least one of the at least two transmission antenna elements 16a, 16b. Polarization detection devices 38 and/or rotating devices 42 may be applied in this regard. The evaluation of the partial contributions of linearly polarized electromagnetic waves enables to more precisely investigate the object under test 24, for example in view of its radar reflection properties. The determining procedure of the partial contributions of the polarization may also be conducted at a later stage of method 90. However, based on a variation of the polarization of electromagnetic waves transmitted by at least one of the at least two transmission antenna elements 16a, 16b, the interaction with the object under test 24 will generally effect the polarization of the received electromagnetic waves. Measuring this polarization of the received waves in dependence of the polarization of the transmitted waves, therefore, allows conclusions to be made on the object under test 24 itself.

FIG. 5 is a schematic drawing of a representative method 110 for spatially resolved detection of an object under test according to an embodiment. Some aspects of the method 110 have been explained hereinbefore with regard to devices, such as the MRS 10. The aspects are to be correspondingly transferred. The method 110 may comprise individual steps previously described with regard to method 60 and/or method 90. Repeated explanation of these steps is omitted. Also, method 110 may be (sub)-combined with at least one of the optional steps disclosed in view of method 60 and/or method 90.

However, method 110 depicts an example where multiple scattering centers 28 have been determined to be present within the at least partially shared coverage area 14 of the MIMO antenna array 12. Consequently, a notification may be provided by the data processing circuit 22 to a user interface 32.

The method 110 may then comprise the optional step 120 of receiving a user input by a user interface 32 in case of multiple scattering centers 28 being located within the at least partially shared coverage area 14. Put differently, the user may select a particular scattering center 28 of interest. For example, a first scattering center 28a may be arranged at the border of the at least partially shared coverage area 14 while a second scattering center 28b may be located near the center of the at least partially shared coverage area 14. The second scattering center 28b could then depict a particular object of interest as it may, for example, potentially cause a collision with the at least two-dimensional multistatic array 20 of antenna elements if at least one of both is moving. Hence, the user may select the second scattering center 28b and apply a user input via the user interface 32 accordingly.

Consequently, in step 118 of method 110 the spatially resolved scattering center distribution 30 is determined for the selected scattering center 28 based on the user input.

Alternatively or cumulatively, any of methods 60, 90, 110 may also include that in case of multiple scattering centers 28 determined to be at least partially located within the at least partially shared coverage area 14, the spatially resolved scattering center distribution 30 is determined for all determined scattering centers 28 with or without any notification to a user interface 32 while not requiring any external user input.

Instead of the MIMO antenna array 12 shown, which comprises multiple reception antenna elements and multiple transmission antenna elements, the multistatic array 20 may be established as a single-input and multiple-output (SIMO) antenna array, e.g., an antenna array with one reception antenna element and at least two transmission antenna elements, or rather a multiple-input and single-output (MISO) antenna array, e.g., an antenna array with at least two reception antenna elements and one transmission antenna element.

The respective antenna elements provide (virtual) channels among each other. For instance, a MIMO multistatic array with five reception antenna elements and five transmission antenna elements has 25 (virtual) channels. An equivalent SIMO multistatic array has one reception antenna element and 24 transmission antenna elements. In a similar manner, an equivalent MISO multistatic array has 24 reception antenna elements and one transmission antenna element.

The MIMO antenna array 12 relates to a certain embodiment, as a total number of 10 antenna elements is required rather than 25 antenna elements which are needed in case of the MISO or rather SIMO multistatic array in order to ensure the equivalent number of channels.

In any case, the two-dimensional multistatic array may have at least two channels, which are established by either at least one reception antenna element and at least two transmission antenna element or at least two reception antenna elements and at least one transmission antenna element.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may take the form of applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

These computer program instructions may be loaded onto one or more computers or computing devices, such as special purpose computer(s) or computing device(s), or other programmable data processing apparatus(es) to produce a specifically-configured machine, such that the instructions which execute on one or more computer or computing devices or other programmable data processing apparatus provide operations for or implement the functions specified in the flowchart block or blocks and/or carry out the methods described herein.

These computer program instructions may also be stored in one or more computer-readable memory or portions thereof, such as the computer-readable storage media, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

According to some embodiments, many individual steps of a process may or may not be carried out utilizing computer or computing based systems described herein, and the degree of computer implementation may vary, as may be desirable and/or beneficial for one or more particular applications.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A multistatic radar system for a spatially resolved detection of an object under test, the multistatic radar system including:
   an at least two-dimensional multistatic array of antenna elements having an at least partially shared coverage area, and
   at least one data processing circuit coupled to the at least two-dimensional multistatic array, wherein the at least one data processing circuit is configured to:
      perform beamforming, thereby obtaining at least one image of the object under test at least partially being located within the at least partially shared coverage area,
      process the image obtained to resolve at least one scattering center of the object under test, determine a spatially resolved scattering center distribution based on the at least one image obtained, and
classify the at least one scattering center with regard to at least a threat level based on the determined spatially resolved scattering center distribution, and
a user interface coupled to the at least one data processing circuit,
wherein the at least one data processing circuit is configured to forward the spatially resolved scattering center distribution to the user interface,
wherein, if the data processing circuit detects multiple scattering centers within the at least partially shared coverage area, the data processing circuit provides a notification to the user interface, and
wherein the notification provided to the user interface is triggered only if a distance between the multiple scattering centers located within the at least partially shared coverage area equals or exceeds a predetermined threshold value.

2. The multistatic radar system according to claim 1, wherein the at least two-dimensional multistatic array of antenna elements comprises at least two transmission antenna elements and/or at least two reception antenna elements.

3. The multistatic radar system according to claim 1, wherein the at least one data processing circuit is configured to determine the spatially resolved scattering center distribution at different distances based on the at least one image obtained.

4. The multistatic radar system according to claim 1, further comprising at least one reference reflector having a predetermined radar cross section far-field value, and wherein the at least one data processing circuit is configured to determine an absolute radar cross section far-field value of the radar cross section of the object under test based on the spatially resolved scattering center distribution and a predetermined radar cross section far-field value of the reference reflector.

5. The multistatic radar system according to claim 1, further comprising a data storage medium coupled to the at least one data processing circuit, and wherein at least the spatially resolved scattering center distribution is stored therein.

6. The multistatic radar system according to claim 1, wherein the multistatic radar system is configured to measure a cross-polarization of a detected electromagnetic wave reflected by the object under test, and wherein the at least one data processing circuit is configured to determine polarimetric information of the object under test based on the measured cross-polarization and polarization information of electromagnetic waves transmitted by at least one transmission antenna element.

7. The multistatic radar system according to claim 1, wherein, in case of multiple scattering centers located within the at least partially shared coverage area, a spatially resolved scattering center distribution is determined for a selected scattering center by the at least one data processing circuit based on a user input received by the user interface.

8. The multistatic radar system according to claim 1, wherein the at least one data processing circuit is configured to determine at least a horizontal and/or a vertical polarization of electromagnetic waves received by at least one of the at least two reception antenna elements upon a variation of a polarization axis of electromagnetic waves transmitted by at least one transmission antenna element.

9. The multistatic radar system of claim 8, wherein the polarization axis of the at least one transmission antenna element or the at least one transmission antenna element itself is rotatable.

10. The multistatic radar system according to claim 1, wherein the at least one data processing circuit is configured to classify the at least one scattering center with regard to at least one of an object type and a characteristic of the object under test based on the determined spatially resolved scattering center distribution.

11. The multistatic radar system according to claim 1, wherein the at least one data processing circuit is configured to provide a radar cross section far-field value, a radar cross section equivalent near-field value and a resolved scattering power distribution by outputting through a user interface.

12. A method for spatially resolved detection of an object under test, the method including:
providing an at least two-dimensional multistatic array of antenna elements having an at least partially shared coverage area,
performing analog and/or digital beamforming using at least one data processing circuit coupled to the at least two-dimensional multistatic array, thereby obtaining at least one image of the object under test at least partially being located within the at least partially shared coverage area,
processing the image to resolve at least one scattering center of the object under test,
determining a spatially resolved scattering center distribution based on the at least one image obtained,
classifying the at least one scattering center with regard to at least a threat level based on the determined spatially resolved scattering center distribution,
forwarding the spatially resolved scattering center distribution to a user interface coupled to the at least one data processing circuit, and
providing a notification to the user interface if the data processing circuit detects multiple scattering centers within the at least partially shared coverage area,
wherein the notification provided to the user interface is triggered only if a distance between the multiple scattering centers located within the at least partially shared coverage area equals or exceeds a predetermined threshold value.

13. The method according to claim 12, further comprising:
determining the spatially resolved scattering center distribution at different distances based on the at least one image obtained.

14. The method according to claim 12, further comprising:
determining an absolute value of the radar cross section radar cross section far-field value of the object under test based on the spatially resolved scattering center distribution and a predetermined radar cross section far-field value of a reference reflector.

15. The method according to claim 12, further comprising:
storing at least the spatially resolved scattering center distribution within a storage medium coupled to the at least one data processing circuit.

16. The method according to claim 12, further comprising:
measuring a cross-polarization of a detected electromagnetic wave reflected by the object under test, and
determining polarimetric information of the object under test based on the measured cross-polarization and polarization information of electromagnetic waves transmitted by at least one of the at least two transmission antenna elements.

17. The method according to claim 12, further comprising:
receiving a user input received by a user interface in case of multiple scattering centers being located within the at least partially shared coverage area, and
determining a spatially resolved scattering center distribution for a selected scattering center based on the user input.

18. The method according to claim 12, further comprising:
determining at least a horizontal and/or a vertical polarization of electromagnetic waves received by at least one of the at least two reception antenna elements upon a variation of a polarization axis of electromagnetic waves transmitted by at least one of the at least two transmission antenna elements.

19. The method according to claim 12, further comprising:
classifying the at least one scattering center with regard to at least one of an object type and a characteristic of the object under test based on the determined spatially resolved scattering center distribution.

20. The method according to claim 12, further comprising:
outputting, through a user interface, a radar cross section far-field value, a radar cross section equivalent near-field value and a resolved scattering power distribution provided by at least one data processing circuit.

* * * * *